United States Patent [19]

Sommer

[11] Patent Number: 4,494,635

[45] Date of Patent: Jan. 22, 1985

[54] INCHING DRIVE FOR CLUTCH/BRAKE UNIT

[75] Inventor: Gordon M. Sommer, Boca Raton, Fla.

[73] Assignee: Sommer Co., Warren, Mich.

[21] Appl. No.: 403,300

[22] Filed: Jul. 30, 1982

[51] Int. Cl.³ .................. B60K 41/28; F16H 57/10; F16H 37/06

[52] U.S. Cl. .................. 192/12 C; 192/18 A; 74/665 C; 74/411.5

[58] Field of Search ............. 192/18 A, 18 R, 12 C, 192/85 A, 67 R, 48.3, 48.8, 0.02, 0.098, 58 C; 74/665 C, 606 R, 665 A, 665 H, 411.5

[56] References Cited

U.S. PATENT DOCUMENTS

| | | | |
|---|---|---|---|
| 2,931,424 | 4/1960 | Pickles | 192/67 R |
| 3,273,415 | 9/1966 | Frost | 192/48.8 X |
| 3,460,656 | 8/1969 | Swanson | 192/87.13 X |
| 3,696,898 | 10/1972 | Sommer | 192/58 C |
| 4,125,178 | 11/1978 | Monks | 192/12 C |

Primary Examiner—George H. Krizmanich
Attorney, Agent, or Firm—Harness, Dickey & Pierce

[57] ABSTRACT

An inching drive for a clutch/brake unit, the unit having a main housing and an input shaft and an output shaft operably associated with said main housing, the inching drive comprising an inching motor having a drive shaft, a housing secured to the inching motor into which the inching motor drive shaft extends, a first gear mechanism disposed at least in part within the inching drive housing and operably associated with the inching motor drive shaft, a second gear mechanism operably associated with the input shaft of the clutch/brake unit, and a mechanism for selectively engaging said first gear mechanism with said second gear mechanism wherein engagement of the first gear mechanism with the second gear mechanism permits the inching motor to drive the input shaft of the clutch/brake unit.

8 Claims, 2 Drawing Figures

INCHING DRIVE FOR CLUTCH/BRAKE UNIT

BACKGROUND AND SUMMARY OF THE INVENTION

The present invention relates generally to a combination clutch/brake unit and inching drive and, more particularly, to an integrated inching drive for an oil submerged clutch/brake unit.

Clutch/brake units have several applications to which they should be applied. One application involves inching of the output shaft of the unit, such as in setting a male die versus a female die, feeding of sheet metal stock or paper, or use of any type of conveyor, turntable or other automation equipment where indexing may be used. Another application may be to provide progressive die pressing or punching operations. For the clutch/brake unit to be applied to these various additional applications which are presently not applicable to clutch/brake units of the type described, a separate inching motor must be secured as a replacement on the input shaft of the clutch/brake unit externally of the unit to replace whatever drive motor is normally attached to that input shaft.

Accordingly, it is one object of the present invention to expand the capability of the submerged clutch/brake unit to various inching operations with an integrated yet removable inching drive unit. In furtherance of this object, a modular inching drive unit is presented herein which permits the option of inching to be used or not used as desired, without inhibiting the various other applications to which the clutch/brake unit may be applied.

Another object of the present invention is to provide an inching drive which need not be removed from the clutch/brake unit when not used, yet will not affect any other function performed by the clutch/brake unit. Accordingly, a control mechanism is included with the indexing drive having a clutch actuation mechanism which is activated whenever inching movement is desired. This actuation mechanism is pneumatically-controlled and the clutch mechanism for the actuation mechanism is submerged in oil. The inching drive mechanism is readily incorporated with a clutch/brake unit with minimal modification of the basic unit, and may be completely removed from the clutch/brake unit without affecting the basic operation of the unit.

Further objects of the present invention are to provide a new and improved inching drive for a clutch/brake unit of the character described which is simple and compact in design, economical to produce and operate, extremely rugged and maintenance-free during operation, and adaptable to be selectively employed in a variety of types of automation equipment setting where indexing or inching is desireable.

Other objects and advantages of the present invention will become apparent in the following detailed description taken in conjunction with the accompanying drawings.

DETAILED DESCRIPTION OF THE PREFERRED EMBODIMENT

Figure 1:
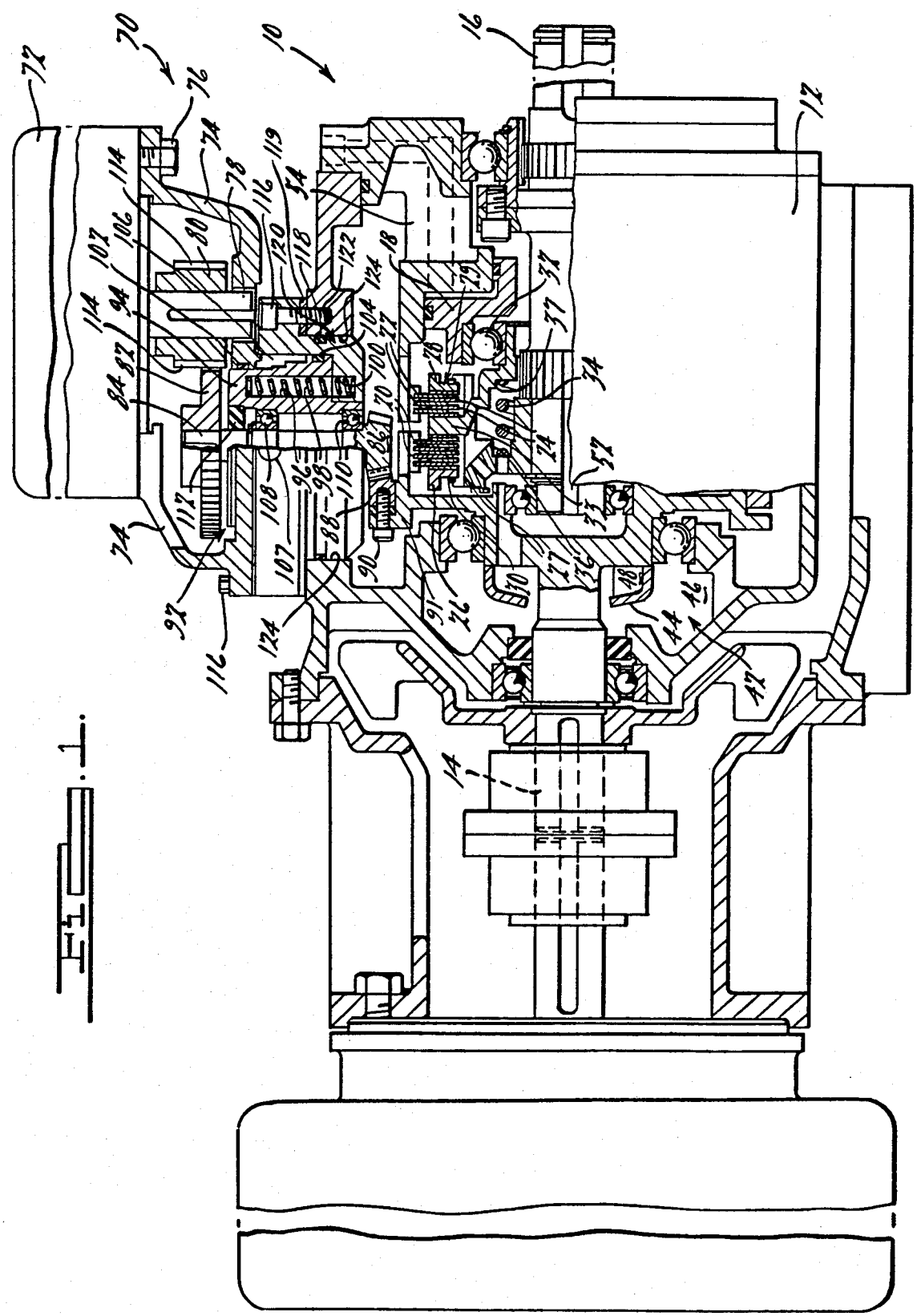
FIG. 1 is a longitudinal side sectional view partially in elevation of a clutch/brake unit having an inching drive of the present invention mounted thereon.
Figure 2:
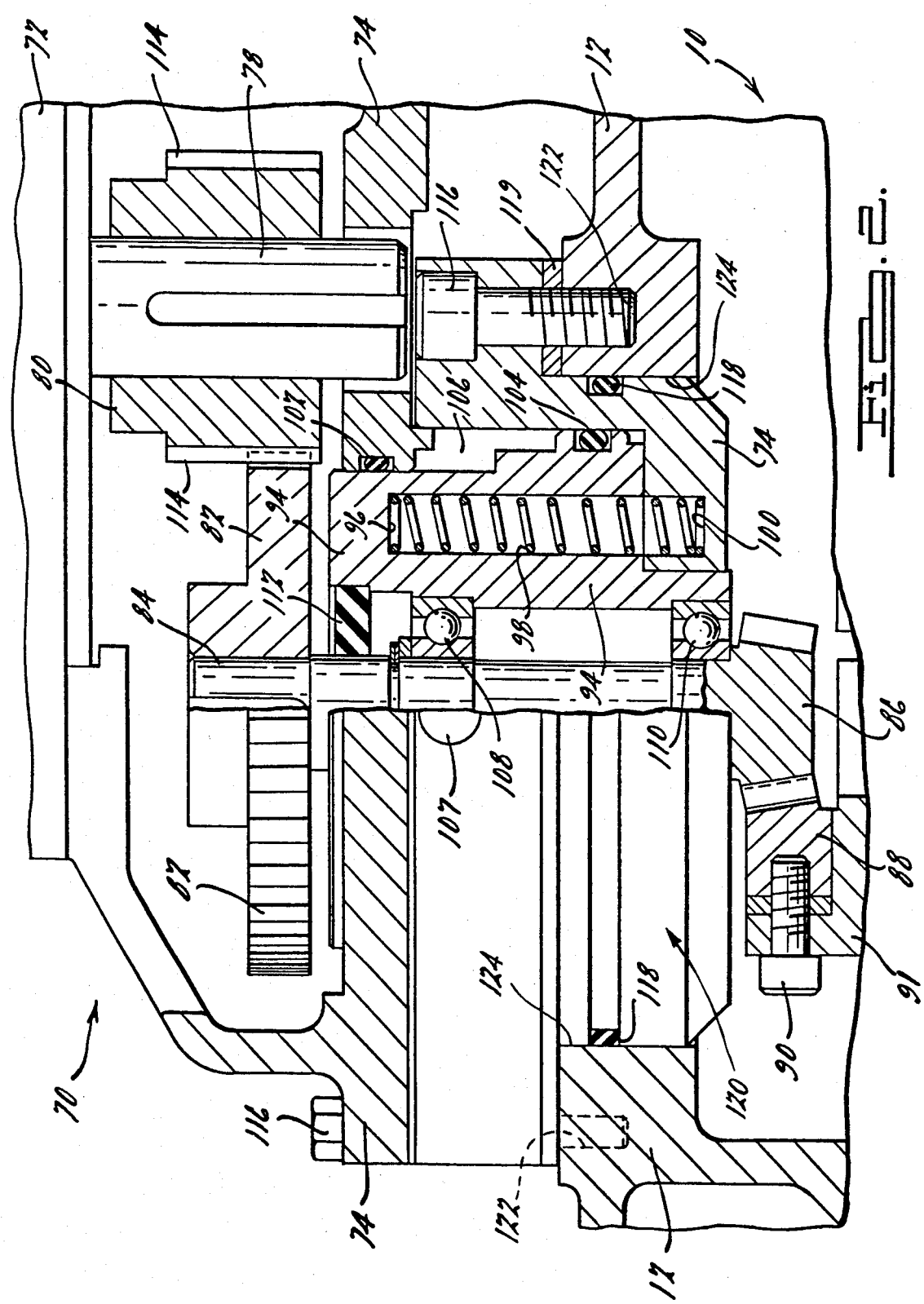
FIG. 2 is an enlarged side sectional view of a portion of the inching drive unit.

Referring to FIG. 1, a clutch/brake unit 10 is illustrated similar to that described in applicant's U.S. Pat. No. 3,696,898, issued Oct. 10, 1972. The clutch/brake unit 10 is comprised of a housing 12, axially aligned input shaft 14 and output shaft 16 mounted in the housing 12, a non-rotatable pneumatically actuated piston 18 in the housing 12, a series of radially disposed clutch plates 20 mounted for rotation with the input shaft 14, a series of radially disposed brake plates 22 spaced axially from the clutch plates 20 and non-rotatably attached to the housing 12, a series of friction discs 24 mounted on the output shaft 16 for rotation therewith and adapted for selective frictional engagement with the clutch 20 and brake plates 22, a fixed clutch actuating member 26 and a fixed brake actuating member 28 carried on the output shaft 16 adjacent the clutch 20 and brake plates 22, securement bolts 30 extending between the last two members 26 and 28, whereby the members 26 and 28 are movable together axially of the output shaft 16, and a bearing 32 disposed between the piston 18 and the movable primary clutch and brake actuating member 33 through which the piston 18 drives the movable actuating member 33 against the fixed clutch 26 or fixed brake 28 actuating members and thereby actuate the clutch 27 or brake 29. Movement of the piston 18 in one direction serves to simultaneously frictionally engage the clutch plates 20 with certain of the friction discs 24 and to release the remaining friction discs 24 from frictional engagement with the brake plates 22 (clutch actuation), and movement of the piston 18 in the other direction serves to simultaneously release the clutch plates 20 from the frictional engagement with certain friction discs 24 and to frictionally engage the remaining friction discs 24 with the brake plates 22 (brake actuation). Springs 34 are mounted between recesses 36 at one end of the output shaft 16 and recesses 37 in the member 33 to normally urge the member 33 toward a position wherein the springs 34 effect engagement of the brake 29 and release the clutch 27. A pumping mechanism 42 is disposed on the input shaft 14 having a centrifugal pump 44 rotatable with the shaft 14 in an annular chamber 46. The pump 44 has vanes 48 at the outer periphery thereof to direct the fluid into an oil cooler (not shown) or the oil delivery system of the clutch/brake unit 10, such as passageways 52, 54.

An inching drive mechanism 70 is mounted to the housing 12. The inching drive mechanism 70 comprises an inching motor 72 and housing 74 which are mounted together by bolts 76. The motor 72 has an output shaft 78 extending into the housing 74 upon which is mounted a first pinion drive gear 80. The gear 80 meshes with a second drive gear 82 mounted on a shaft 84 disposed parallel to the output shaft 78 of the motor 72 and perpendicular to the input 14 and output 16 shafts of the clutch/brake unit 10. The opposite end of the shaft 84 has a beveled pinion gear 86 secured thereto which is engageable with an annular rack gear 88 secured by a plurality of bolts 90 to a radially outwardly extended portion 91 of the input shaft 14 of the clutch/brake unit 10.

Also disposed within the housing 74 is an actuation mechanism 92 for the inching mechanism 70 which comprises an annular piston 94 having a series of recesses 96 in which are disposed one end of a plurality of springs 98, the other end of which springs 98 are disposed in recesses 100 within the housing 74. The housing 74, annular piston 94, and upper 102 and lower 104 seals form an air chamber 106. The annular air chamber 106 is fed pneumatically via port 107 to dispose the annular piston 94 in a downward direction from its pre-actuation position as pre-loaded by the springs 98.

The drive shaft 84 is connected to the annular piston 94 by means of two roller bearings 108, 110 and a seal 112 which maintains the chamber formed by the housing 74 separate from the chamber formed by the housing 12 on the clutch/brake unit 10.

In operation, the piston 94 is set in its normal position vertically upwardly disposed by the preload of the springs 98. Thus, the beveled pinion gear 86 is disposed upwardly out of contact with the annular beveled rack gear 88. Upon pneumatic actuation, the piston 94 is driven vertically downwardly to bring the pinion gear 86 into contact with the beveled rack gear 88. The drive gear 82 is always in contact with the pinion drive gear 80 and slides along the splines 114 thereof. The inching motor 72 is actuated to drive the input shaft 14 of the clutch/brake unit 10 via the extended portion 91, and the clutch 27 of the clutch/brake unit 10 is actuated so that the input shaft 14 drives the output shaft 16 of the clutch/brake unit 10 and thereby any accessory mounted to that output shaft 16. Actuation of the brake 29 will stop the output shaft 16, after disengaging the clutch 27, and thereby stop powering any accessory driven by the shaft 16.

The inching drive 70 is secured to the clutch/brake unit 10 by a plurality of bolts 116 between housing 74 and housing 12 of the unit 10. An appropriate seal 118 and gasket 119 are also disposed between the housings 12 and 74. If the inching drive need be removed for repair, replacement or otherwise, a cap (not shown) may be placed over the housing 12 of the unit 10 and the unit may continue to operate its other functions without inhibition by removal of the inching drive 70. The inching drive 70 may be added to the clutch/brake unit 10 at any time in the lifetime of the unit 10 as long as the mounting station 120 (with mounting locations 122 and access opening 124) and rack gear 88 exist on the unit 10.

While it will be apparent that the preferred embodiment as illustrated herein is well calculated to fulfill the objects above stated, it will also be appreciated that the present invention is susceptible to modification, variation and change without departing from the proper scope fair meaning of the subjoined claims.

I claim:

1. An inching drive unit for a clutch/brake unit having a main housing and an input shaft and an output shaft operably associated with said main housing, said inching drive comprising:
   inching motor means for driving said inching drive unit, having a drive shaft extending therefrom;
   a second housing secured to said inching motor means, said drive shaft of said inching motor means extending into said second housing;
   first gear means disposed at least in part within said second housing and operably associated with said inching motor drive shaft including a gear shaft and at least one pair of gears fixedly mounted one at substantially each end of said gear shaft;
   second gear means operably associated with said input shaft of said clutch/brake unit; and
   means for selectively engaging said first gear means with said second gear means comprising a piston disposed around and fixedly secured to said gear shaft, a chamber surrounding said gear shaft within which said piston moves, and means biasing said piston to place said first gear means out of engagement with said second gear means, wherein engagement of said first gear means with said second gear means permits said inching motor means to drive said input shaft of said clutch/brake unit.

2. An inching drive unit in accordance with claim 1, wherein said inching drive unit is removably mounted to said main housing wherein removal or attachment of said inching drive unit does not inhibit the basic functioning of said clutch/brake unit.

3. An inching drive unit in accordance with claim 1, wherein said means for selectively engaging includes a piston movably disposed in a chamber wherein movement of said piston is controlled by pressurized air fed into said chamber.

4. An inching drive unit in accordance with claim 1, wherein said clutch/brake unit further comprises clutch means for engagement of said input and output shafts and brake means for braking said output shaft and wherein said inching drive unit drives said output shaft through said clutch means.

5. An inching drive unit for a clutch/brake unit having a main housing and an input shaft and an output shaft operably associated with said main housing, said unit having controls for application of a clutch and a brake, said main housing having an interior portion, said inching drive unit comprising:
   inching motor means for driving said inching drive unit, having a drive shaft extending therefrom;
   a second housing secured to said inching motor means, said drive shaft of said inching motor means extending into said second housing;
   first gear means disposed within said second housing and fixedly secured to said inching motor drive shaft, said first gear means having splines extending on the outer periphery thereof;
   a second shaft rotatably disposed within said second housing and extending into said main housing;
   second gear means fixedly disposed within said second housing at one end of said second shaft to rotate with said second shaft and operably engageable with said first gear means to be driven by said first gear means and thereby drive said second shaft;
   third gear means fixedly disposed at the other end of said second shaft opposite said second gear means to rotate with said second shaft and disposed within said main housing;
   fourth gear means operably associated with said input shaft of said clutch/brake unit; and
   means for selectively engaging said third gear means with said fourth gear means comprising a piston surrounding and secured to said second shaft and an annular chamber surrounding said second shaft within which said piston moves based upon the air pressure within said chamber, wherein engagement of said third gear means with said fourth gear means via movement of said piston permits said inching motor means to drive said input shaft of said clutch/brake unit and have movement of the output shaft of the clutch/brake unit be controlled by said clutch and brake controls.

6. An inching drive unit in accordance with claim 5, wherein said means for selectively engaging comprises:
   a pneumatic chamber within said second housing;

annular piston means secured to said second shaft and operably associated with said pneumatic chamber; wherein movement of said piston means in a first direction engages said third gear means with said fourth gear means, and movement of said piston means in a second direction spaces apart said third gear means from said fourth gear means, said piston means being movable in response to the pressure of air in said pneumatic chamber.

7. An inching drive unit in accordance with claim 5, wherein said first and second shafts are parallel.

8. An inching drive unit in accordance with claim 5, wherein said third gear means comprises a beveled pinion gear and said fourth gear means comprises an annular beveled rack gear.

* * * * *